(12) United States Patent
Xhafa et al.

(10) Patent No.: US 8,131,230 B2
(45) Date of Patent: Mar. 6, 2012

(54) METHOD AND SYSTEM FOR FM TRANSMITTER COEXISTENCE

(75) Inventors: Ariton E. Xhafa, Plano, TX (US); Deric W. Waters, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 576 days.

(21) Appl. No.: 12/394,372

(22) Filed: Feb. 27, 2009

(65) Prior Publication Data
US 2009/0247071 A1 Oct. 1, 2009

Related U.S. Application Data

(60) Provisional application No. 61/039,251, filed on Mar. 25, 2008.

(51) Int. Cl.
*H03B 1/04* (2006.01)

(52) U.S. Cl. ........ 455/110; 455/113
(58) Field of Classification Search .......... 455/110, 455/108, 113, 39, 42, 43
See application file for complete search history.

(56) References Cited

U.S. PATENT DOCUMENTS

2007/0154213 A1 * 7/2007 Hinderthur ............ 398/25
* cited by examiner

*Primary Examiner* — An Luu
(74) *Attorney, Agent, or Firm* — Steven A. Shaw; W. James Brady; Frederick J. Telecky, Jr.

(57) ABSTRACT

A system and method for operating an FM system and wireless networking system coexistent in a mobile wireless device. A mobile wireless device includes a frequency modulation ("FM") system that includes an FM transmitter and, optionally, an FM receiver. The mobile wireless device also includes a wireless networking system having a network receiver. The FM system is configured to disable the FM transmitter if an amplitude of a modulating signal provided to the FM transmitter is below a predetermined threshold.

22 Claims, 4 Drawing Sheets

METHOD AND SYSTEM FOR FM TRANSMITTER COEXISTENCE

The present application claims priority to and incorporates by reference provisional patent application 61/039,251, filed on Mar. 25, 2008, entitled "Method and Systems for FM Transmitter Coexistence."

BACKGROUND

As wireless technologies proliferate, mobile wireless devices incorporate a multiplicity of different wireless technologies. For example, a cellular telephone can accommodate a cellular network (e.g., Universal Mobile Telecommunications System), a local area network, such as IEEE 802.11, and a personal area network (e.g., Bluetooth).

Some mobile devices also utilize receive only networks, such as one or more of the global navigation satellite systems ("GNSS"). Examples of GNSS include the Global Positioning System ("GPS"), the GLObal Navigation Satellite System (GLONASS), the Galileo system, the Quazi-Zenith Satellite System (QZSS), and Beidou. GNSS enabled devices can use the navigation system to provide directions or location information while the device simultaneously accesses one or more wireless networks, for example, receiving a voice call via a cellular network and utilizing a Bluetooth headset.

Additionally, a mobile device can incorporate frequency modulated ("FM") transmit and receive capabilities to provide, for example, audio data transfer. Unfortunately, out of band transmissions or harmonics generated by the FM system, or a different wireless system colocated (i.e., located together) in the mobile device can saturate the receiver of a different wireless system in the device. Reducing interference caused by simultaneous operation of a multiplicity of wireless technologies, including FM transmission systems, coexisting in a mobile wireless device is desirable.

SUMMARY

Various systems and methods for utilizing an FM system and one or more other wireless technologies colocated in a wireless device are disclosed herein. In accordance with at least some embodiments, a mobile wireless device includes a frequency modulation ("FM") system that includes an FM transmitter and, optionally, an FM receiver. The mobile wireless device also includes a wireless networking system having a network receiver. The FM system is configured to disable the FM transmitter if an amplitude of a modulating signal provided to the FM transmitter is below a predetermined threshold.

In accordance with at least some other embodiments, a method includes determining whether a wireless networking system in a mobile wireless device is active. A priority signal provided to an FM system in the mobile wireless device by the wireless networking system is asserted if the wireless networking system is active. Operation of an FM transmitter is changed to reduce a level of interference induced in the wireless networking system by the FM system based on the assertion of the priority signal.

In accordance with yet other embodiments, a mobile wireless device includes an FM system, a wireless networking system, and a priority controller. The wireless networking system and the FM system are colocated in the mobile wireless device. The priority controller assigns operational priorities to the FM system and the wireless networking system based, at least in part, on types of data being processed by the FM system and the wireless networking system. The one of the FM system and the wireless system assigned a lower priority operates to reduce a level of interference induced in the one of the FM system and the wireless system assigned a higher priority.

In accordance with yet other embodiments, a mobile wireless device includes an FM system, a wireless networking system, a hardware resource, and a priority controller. The mobile wireless device uses the wireless networking system to access a wireless network. The wireless networking system includes a network receiver and a network transmitter. The hardware resource is shared by the FM system and the wireless networking system. The priority controller allocates the hardware resource to one of the FM system and the wireless networking system.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
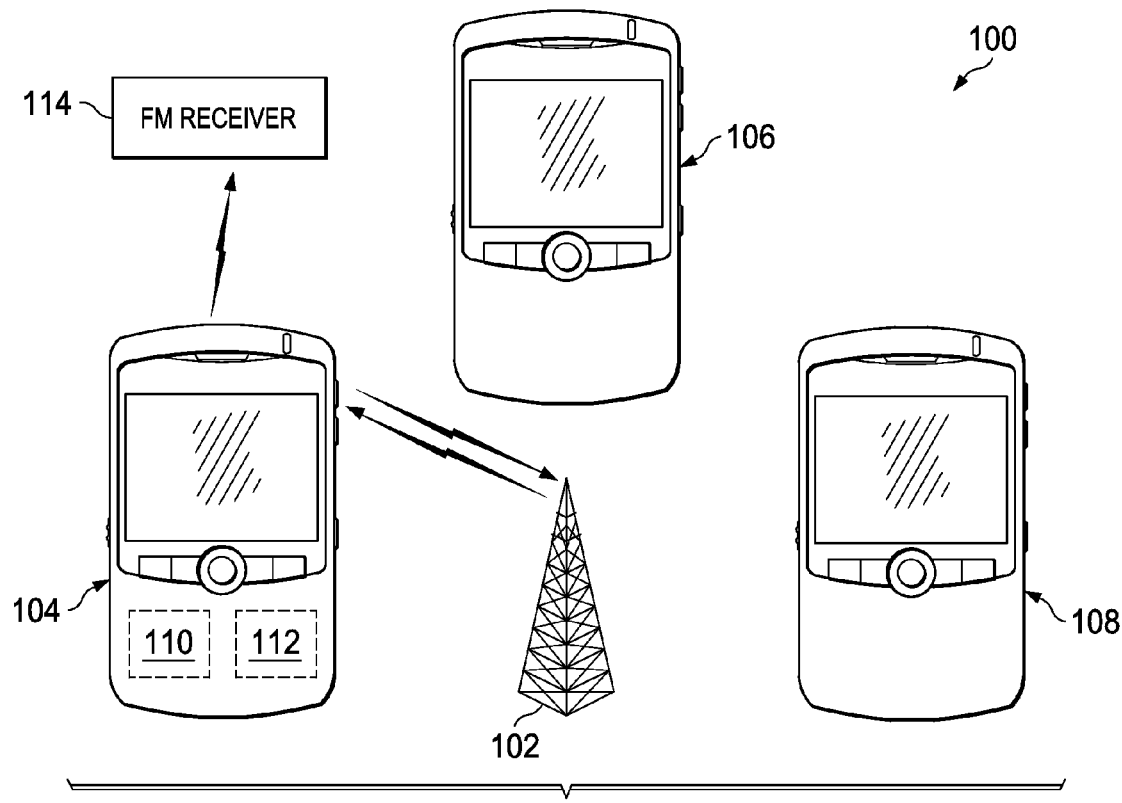
FIG. 1 shows an exemplary wireless network in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ."Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Disclosed herein are a system and method for operating a frequency modulation ("FM") system and a wireless networking technology colocated in a mobile wireless device. While access to multiple wireless systems provides a number of benefits, interference between different technologies can make simultaneous operation of different wireless technologies colocated in a mobile device problematic. For example, out of band emissions or harmonics created by one technology (e.g., an FM transmitter) can saturate the receiver of another technology. Moreover, strong signals can create reliability issues in low noise amplifiers. Rejection filter designs may have to provide 40-55 dB of attenuation or more, which is difficult in practice. Embodiments of the present disclosure allow an FM system to coexist in a mobile wireless device with one or more other wireless networking technologies, such as WiMAX (IEEE 802.16), WLAN (IEEE 802.11), long-term evolution ("LTE") networks, wireless USB, Bluetooth, a global navigation satellite system ("GNSS"), etc. Embodiments include inter-technology signaling mechanisms that allow an FM system to identify and/or control periods of possible interference with other technologies.

FIG. 1 shows an exemplary wireless network 100 in accordance with various embodiments. The wireless network 100 includes an access point 102, and a mobile wireless device 104. As illustrated, the wireless network 100 also optionally includes mobile wireless devices 106 and 108. In practice, a wireless network may include one or more mobile wireless devices. The mobile wireless device 104 transmits data to and receives data from the access point 102. The access point 102 can also be referred to as a base station, a node B, etc. Some embodiments of the wireless network 100 can employ ad-hoc networking, and may not include the access point 102. Instead, the mobile wireless devices 104, 106, 108 can communicate directly with one another. Exemplary mobile wireless devices include cellular telephones, personal digital assistants, personal computers, navigation devices, personal music players, video gaming systems, etc.

The mobile wireless device 104 includes a FM system 110 for transmitting data (e.g., audio signals) to an FM receiver 114. The mobile wireless device 104 also includes a wireless networking system 112, which can be, for example, an IEEE 802.11 wireless LAN, WiMAX, Bluetooth, a cellular technology such as LTE, etc. The FM system 110 includes a transmitter that can produce out of band emissions and harmonics that can interfere with reception of network signals, for example, transmissions provided by the access point 102 or another mobile wireless device 106, 108. In some embodiments, the mobile wireless device 104 can include multiple wireless networking systems 112, at least one of which can operate concurrently with the FM system 110. Embodiments encompass all combinations of an FM system 110 and wireless networking systems 112 colocated in a mobile wireless device 104.

Embodiments of the mobile wireless device 104 provide an FM system 110 that reduces interference with the wireless networking system 112. In some embodiments, the FM system 110 reduces or disables carrier transmission when no modulating signal is provided to the FM system 110. In some embodiments, signals provided by the FM system 110 and/or the wireless networking system 112 allow the FM system 110 to reduce interference when the wireless networking system 112 is active (i.e., the transmitter is transmitting or the receiver is receiving transmitted signal). The FM system 110 and the wireless networking system 112 thus coordinate operations to reduce interference caused by FM system 110 operation, and provide improved wireless network system 112 performance.

FM communication is a well-known technology often used for radio broadcasting. The FM operating band (80-107 MHz) generally does not overlap with the bands of wireless networking technologies. The harmonics of the FM band, however, do overlap with the operating bands of the networking technologies. Embodiments of the present disclosure reduce the interference created by FM transmission harmonics to maintain an acceptable quality of service of a colocated wireless networking system.

In frequency modulation, the instantaneous frequency is modulated with the signal s(t). Thus, the instantaneous frequency can be defined as:

$$f_i(t) = f_c + k_f s(t)$$

where $f_c$ is the carrier frequency, and $k_f$ is a constant relating frequency changes to the amplitude value of s(t) (i.e., the modulation index). The transmitted signal may be given as $$\lambda_{fm}(t) = A\cos\theta(t)$$
$$= A\cos 2\pi \left[ f_c t + k_f \int_0^t s(\tau) d\tau \right].$$

In accordance with these equations, when the modulating signal s(t) is zero, the transmitted signal from an FM transmitter is simply the carrier frequency. Thus, the FM signal is continuously transmitted, and the harmonics due to the FM transmitter are always present in other wireless technologies colocated in the same device.

Given the operation of an FM transmitter, signal is continuously output. The output signal contains information about the carrier, and information about the modulating signal. However, in practice, the modulating signal s(t) is not always continuous. Accordingly, embodiments employ this attribute of the modulating signal s(t) to enable the FM transmitter to coexistence with other wireless technologies.

Figure 2:
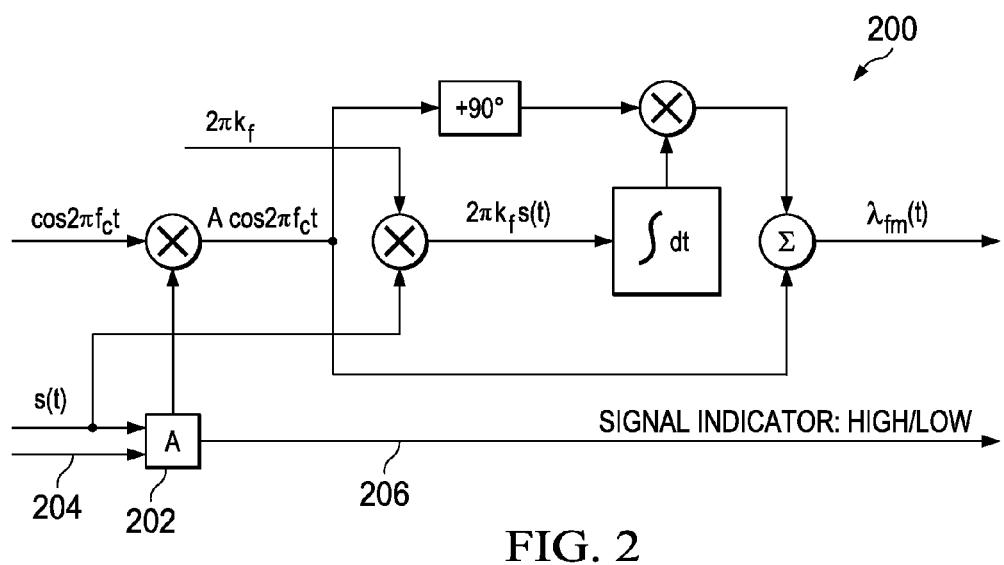
FIG. 2 shows an exemplary block diagram of a frequency modulation ("FM") transmitter in accordance with various embodiments.

FIG. 2 shows an exemplary block diagram of a narrowband FM transmitter 200 in accordance with various embodiments. While a narrowband transmitter 200 is illustrated, a wideband transmitter can be constructed based on the narrowband FM transmitter followed by a frequency multiplier and a frequency shift. In any case, the FM transmitted signal is continuous in the time domain. Embodiments of the present disclosure are applicable to all FM transmitters.

The embodiment of an FM transmitter 200 provides a graphical representation of the equations above. The product of phase shifted carrier signal, A cos $2\pi f_c t$, and an integrated version of the modulating signal, $2\pi k_f s(t)$, is summed with the carrier to provide the FM output signal. Based on the value of s(t), the operation of the FM transmitter 200 can be modified to reduce interference with colocated wireless technologies. For example, in some embodiments the FM transmitter 200 can be turned on or off based on s(t).

In some embodiments, the control block 202 determines the value of the constant A, which determines carrier amplitude. The transmitter 200 can be enabled or disabled by changing the value of the constant A. The signal s(t) is provided to control block 202 where the amplitude of s(t) can be determined, and the value of A can be set in accordance with the amplitude of s(t). A value 206 representing the amplitude of s(t) can also be provided to colocated wireless systems to identify intervals when the FM transmitter 200 is disabled, and during which the colocated technology can operate free of FM transmitter induced interference. For example, the transmitter 200 can be disabled when s(t) is below a predetermined amplitude threshold by setting A to zero in block 202. Other inputs 204 to block 202 can be provided to allow the transmitter to be controlled from other sources.

Some embodiments consider performance requirements of an FM receiver 114 when disabling the transmitter 200 for an interval. The FM receiver 114 may require that a transmitter 200 OFF interval be shorter than the interval indicated by s(t) amplitude. Such embodiments can enable the transmitter 200 while s(t) is below a transmitter 200 OFF threshold for at least an interval that maintains a predetermined level of receiver 114 performance.

Figure 3:
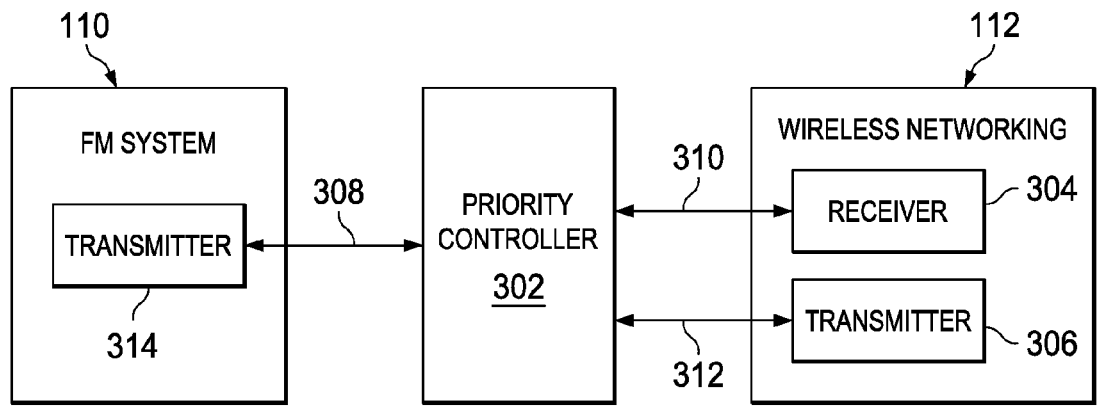
FIG. 3 shows a block diagram of an FM system and a wireless networking system colocated in a mobile wireless device in accordance with various embodiments.

FIG. 3 shows a block diagram of an FM system 110 and a wireless networking system 112 colocated in a mobile wireless device 104 in accordance with various embodiments. The FM system 110 includes an FM transmitter 314 for transmitting FM radio frequency signals to the FM receiver 114. The FM system 110 and the wireless networking system 112 are each coupled to a priority controller 302. The priority controller 302 controls operation of the FM system 110 and the wireless networking system 112 to reduce FM transmitter 314 induced interference. For example, in at least some embodiments the priority controller 302 can control the enabling and disabling of the FM transmitter by, for example, controlling carrier amplitude as described above. Other embodiments can employ other methods of enabling or disabling the transmitter. The signal 308 carries information between the priority controller 302 and the FM transmitter 314. The information can include transmitter 314 control (e.g., power level, enable, or disable) and modulation signal s(t) status, etc.

The wireless networking system 112 includes a transmitter 306 and a receiver 304. The transmitter 306 transmits signals over the wireless network, and the receiver 304 receives signals transmitted over the wireless network. The transmitter 306 and the receiver 304 include a variety of components that are not shown, for example, modulator/demodulator, encoder/decoder, amplifiers, filters, etc.

The receiver 304 and the transmitter 306 exchange information and control with the priority controller 302 via signals 310, 312. Signal 310 couples the receiver 304 to the priority controller 302 and can carry receiver 304 status (e.g., network traffic detected, traffic duration, etc.) and receiver 304 control (e.g., expected interference frequencies, levels, etc.). In some embodiments, the receiver 304 can apply the information received via signal 310 to mitigate interference induced by the FM transmitter 314, for example, by filtering corrupted spectra. Signal 312 couples the transmitter 306 to the priority controller 302 and can carry transmitter 306 status (e.g., ready to transmit, transmit duration, etc.) and transmitter 306 control (e.g., transmit power level, inter-transmission interval, etc.).

In the embodiment of FIG. 3, the wireless networking system 112 may be given priority over the FM system 110 in at least some situations. In such situations, the priority controller 302 can cause the FM transmitter 314 to operate in a manner that reduces transmitter 314 induced interference with operation of the wireless networking system 112. For example, the receiver 304 can assert signal 310 indicating that a packet is being received over the wireless network. In response, the priority controller 302 can assert signal 308 to cause the FM transmitter 314 to reduce interference (e.g., disable the transmitter).

In an embodiment wherein the wireless network is, for example, a wireless local area network ("WLAN"), packets transmitted over the network are broadcast packets, and therefore the packets are received by all wireless devices in the network including the wireless networking system 112. If a transmitted packet is destined for the device 104, the wireless networking system 112 may assert the signal 310 to the priority controller 302 based on the duration of the data transmission or inform the priority controller of the transmit duration via the signal 310.

In at least some embodiments, the priority controller can cause the FM transmitter to reduce interference by reducing transmitter output power if the resultant harmonics do not significantly degrade receiver 304 performance. Reducing output power, rather than disabling the transmitter 314 may be beneficial to the performance of the FM receiver 114.

In some embodiments, if the wireless networking system 112 is inactive (i.e., the receiver 304 is not receiving and the transmitter 306 is not transmitting), then indications provided in the signals 310, 312 can cause the priority controller 302 to enable the FM transmitter 314 via signal 308.

Thus, the priority controller 302 may control the operation of the FM system 110 to reduce transmitter 314 induced interference with the wireless network system 112. The priority controller 302 may base FM system 110 control on, for example, the presence or amplitude of a modulating signal provided to the FM system 110, the performance requirements of the FM receiver 114, and/or the operational states of the wireless networking system receiver 304 or transmitter 306. The priority controller 302 can cause the FM transmitter 314 to discontinue transmissions, or to transmit at a lower power level.

Figure 4:
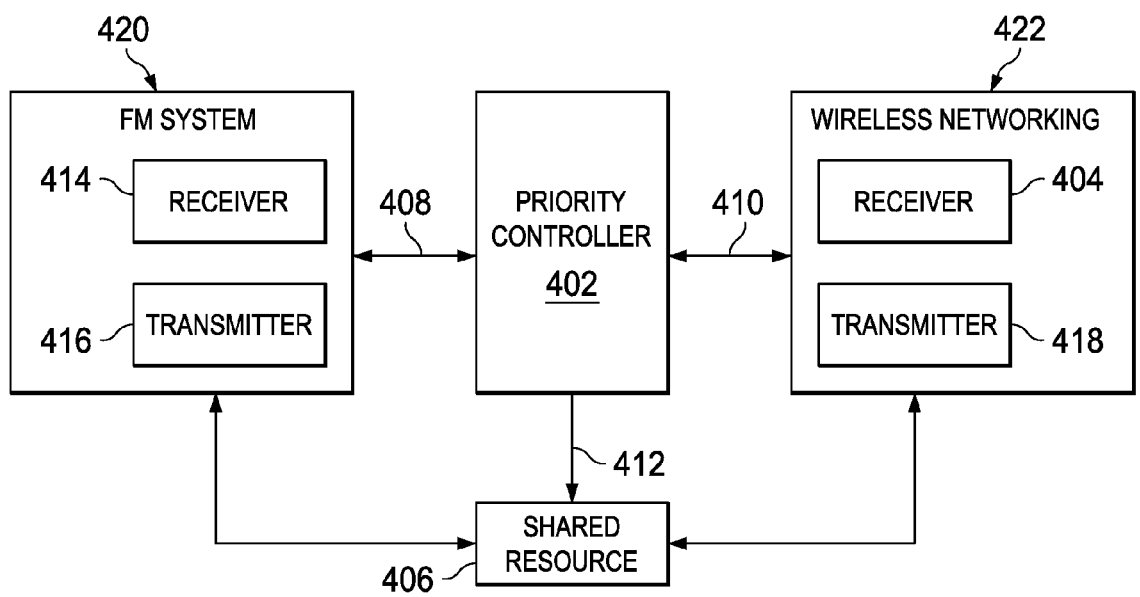
FIG. 4 shows a block diagram of an FM system including an FM receiver colocated with a wireless networking system in a mobile wireless device in accordance with various embodiments.

FIG. 4 shows a block diagram of an FM system 420 colocated with a wireless networking system 422 in a mobile wireless device 104 in accordance with various embodiments. In some embodiments, the FM system 420 may include both an FM receiver 414 and an FM transmitter 416. In other embodiments, the FM system 420 may include only one of the FM receiver 414 and the FM transmitter 416. The FM system 420 and the wireless networking system 422 are each coupled to a priority controller 402. The priority controller 402 controls operation of the FM system 420 and the wireless networking system 422 and allocates a shared resource 406 to one of the FM system 420 and the wireless networking system 422. The shared resource 406 can be a hardware resource such as a processor or processor capacity, or dedicated hardware circuitry (e.g., a decoder, multipliers, memory, correlators, etc.). In some embodiments, the shared resource 406 can include a first resource shared by the receivers 404, 414, and a second resource shared by the transmitters 416, 418. In other embodiments, the shared resource 406 may include one or more resources shared by all of the receivers 404, 414 and the transmitters 416, 418.

The priority controller 402 receives information from and provides control to the FM system 420 via the signal 408. The signal 408 can include information and control similar to that described above with regard to signal 308, but can also indicate that an FM transmission has been detected and/or that the FM receiver 414 or the FM transmitter 416 has priority to use the shared resource 406. Similarly, the priority controller 402 receives information from and provides control to the wireless networking system 422 via the signal 410. The signal 410 can include information and control similar to that described above with regard to signal 310, but can also indicate that the wireless network receiver 404 or the wireless network transmitter 418 has priority to use the shared resource 406. In at least some embodiments, the signal 412 provided to the shared resource 406 can indicate which of the FM receiver 414, the wireless network receiver 404, the FM transmitter 416, and the wireless network transmitter 418 has priority to use the resource 406.

The priority controller 402 arbitrates between the FM system 420 and the wireless networking system 422, and the receivers 414, 404 and the transmitters 416, 418 to determine which has use of the shared resource 406. The arbitration can be based on information provided by the receivers 414, 404 and/or the transmitters 416, 418. For example, in one embodiment, the shared resource 406 may be allocated to the wireless network receiver 404 whenever the receiver 404 requires the resource (e.g., to process a packet), and allocated to the FM receiver at other times. Similarly, the shared resource may be allocated to the wireless network transmitter 418 whenever the transmitter 418 requires the resource (e.g., to transmit a packet), and allocated to the FM transmitter 416 at other times.

Various components of the wireless networking system 112, 422 and the FM system 110, 420, including at least some portions of the receivers 304, 404, 414, the transmitters 306, 314, 416, 418, the priority controllers 302, 402, and the shared resource 406 can be implemented using a processor and software programming that causes the processor to perform the operations described herein. In particular, software programming can cause a processor to provide priority and control signals 308, 310, 312, 408, 410, 412, and attendant operational behavior changes in the FM system 110, 420 and the wireless networking system 112, 422 as described herein. Suitable processors include, for example, general-purpose processors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming can be stored in a computer readable medium. Exemplary computer readable media include semiconductor memory, optical storage, and magnetic storage.

Some embodiments can implement the functionality described herein using dedicated circuitry. Some embodiments may use a combination of dedicated circuitry and software executed on a processor. Selection of a hardware or software implementation of embodiments is a design choice based on a variety of factors, such as cost and the ability to incorporate changed or additional functionality in the future. In at least some embodiments the FM system 110, 420, the wireless networking system 112, 422, the priority controller 302, 402, and/or the shared resource 406 can be provided on the same integrated circuit die.

Figure 5:
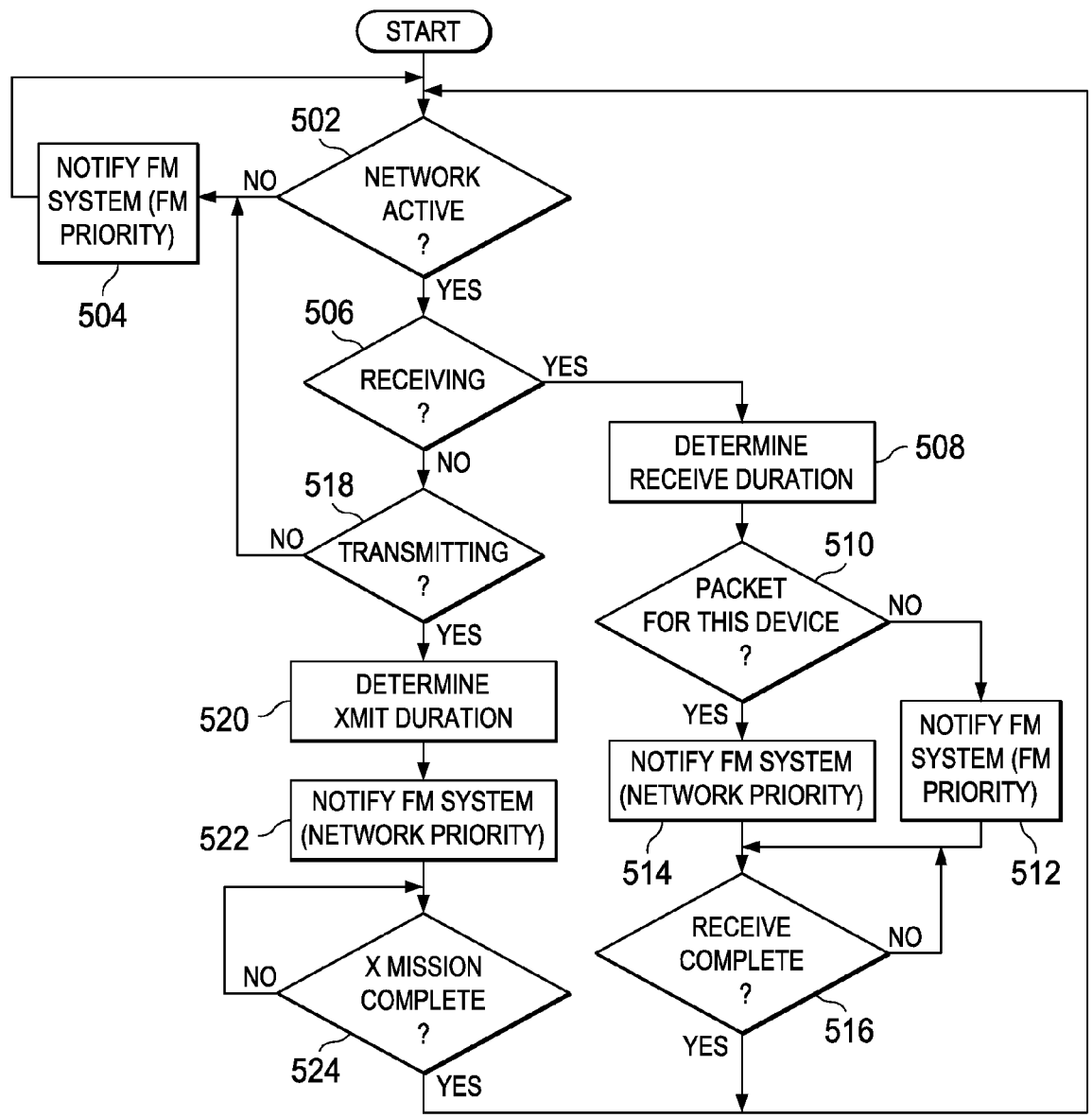
FIG. 5 shows a flow diagram for a method for providing FM system control in accordance with various embodiments.

FIG. 5 shows a flow diagram for a method for providing FM system 110 control in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 5, as well as other operations described herein, can be implemented as instructions stored in a computer readable medium and executed by a processor.

In block 502, a mobile wireless device 104 including an FM system 110 and a wireless networking system 112 is operating. If the networking system 112 is inactive (i.e., no signals are being transmitted or received by the networking system 112), then in block 504, the FM system 110 is notified that it has priority and may enable the FM transmitter 314 either intermittently or continuously. The notification may be provided by signal 308 from the priority controller 302 in at least some embodiments.

If the networking system 112 is active in block 502, then, in block 506, the receiver 304 is checked for activity. If the receiver 304 is receiving a transmission via the wireless network, then the expected duration of reception is determined in block 508. In some networking protocols the duration of a data transmission may be defined in a transmitted packet, or the length of a packet may be fixed.

In block 510, the receiver 304 determines the destination of the data transmission detected in block 506. If the destination is the wireless device 104, then, in block 514, the FM system 110 is notified that the wireless networking system 112 has priority, and that the FM system 110 should reduce interference with the networking system 112 caused by FM system 110 operation. In some embodiments, the FM system 110 may disable the FM transmitter 314. In some embodiments, the FM system 110 may reduce FM transmitter 314 output power, or reduce interference in another way. In some embodiments, the FM transmitter 314 may be intermittently enabled to maintain acceptable FM receiver 114 performance. In at least some embodiments, the priority/control indications are provided to the FM system 110 by the priority controller 302.

If, in block 510, the receiver 304 determines that the transmission detected in block 506 is not destined for device 104, then the FM system 110 is notified that the FM system 110 has priority in block 512. Because the FM system 110 has priority, the FM transmitter 314 may be continuously or intermittently enabled to transmit FM signals.

In block 516, the wireless networking system 112 determines whether the transmission detected in block 506 is complete. If the transmission is complete, the method continues in block 502, otherwise the method continues to check for transmission completion in block 516.

Returning now to block 506, if no transmissions are detected by the receiver 304, then, in block 518, the wireless network transmitter 306 checks for data to be transmitted. If no data is awaiting transmission, then the FM system 110 is notified that the FM system 110 has priority in block 504. Because the FM system 110 has priority, the FM transmitter 314 may be continuously or intermittently enabled to transmit FM signals.

If data is ready for transmission in block 518, then the transmitter 306 determines the transmit duration in block 520. In block 522, the FM system 110 is notified that the wireless networking system 112 has priority, and that the FM system 110 should reduce interference with the networking system 112 caused by FM system 110 operation. In some embodiments, the FM system 110 may disable the FM transmitter 314. In some embodiments, the FM system 110 may reduce FM transmitter 314 output power, or reduce interference in another way. In some embodiments, the FM transmitter 314 may be intermittently enabled to maintain acceptable FM receiver 114 performance. In at least some embodiments, the priority/control indications are provided to the FM system 110 by the priority controller 302.

In block 524, the wireless networking system 112 determines whether the transmission identified in block 518 is complete. If the transmission is complete, the method continues in block 502, otherwise the method continues to check for transmission completion in block 524.

Figure 6:
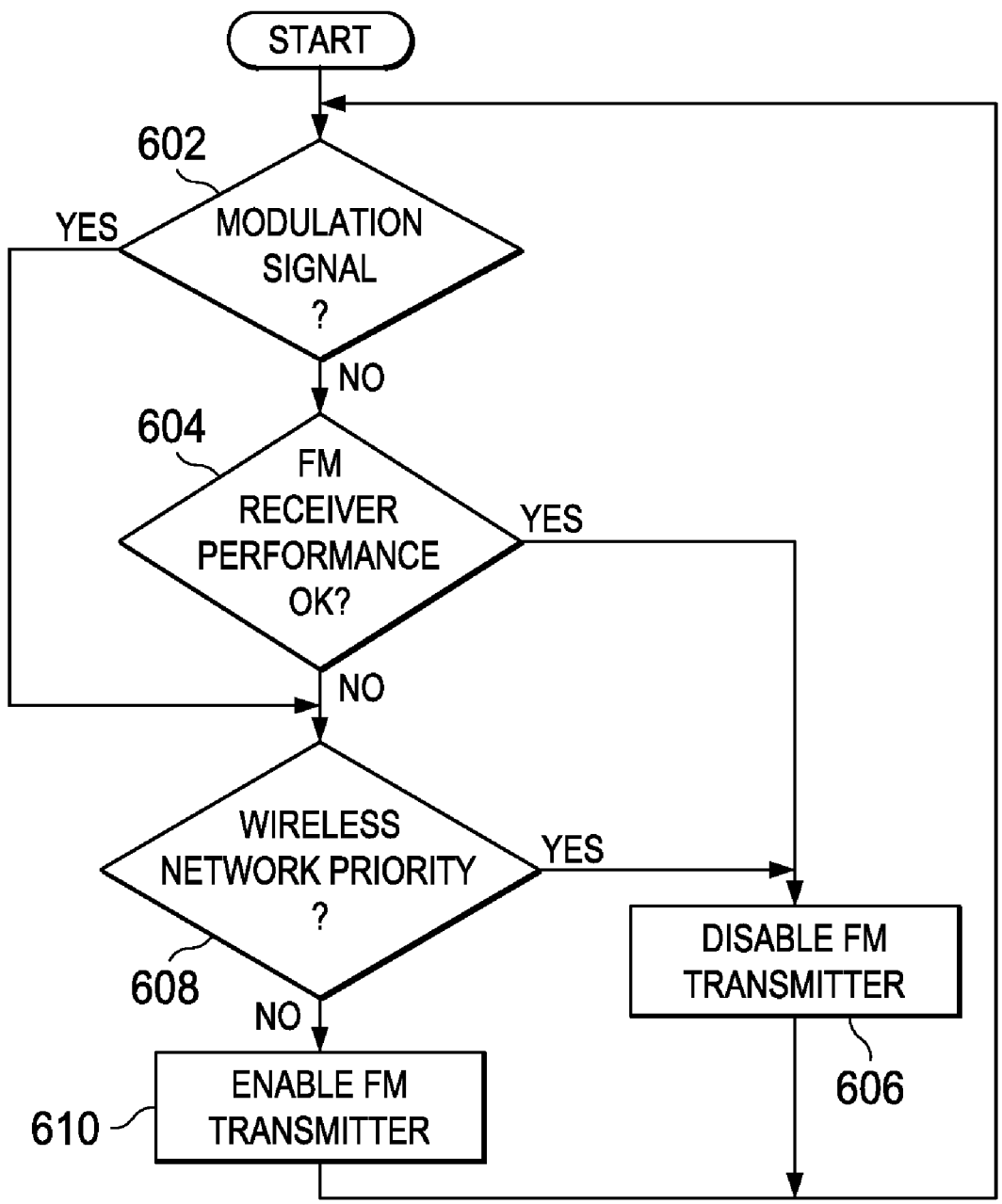
FIG. 6 shows a flow diagram for a method for controlling an FM system based on detection of a modulating signal in accordance with various embodiments.

FIG. 6 shows a flow diagram for a method for controlling an FM system 110 based on detection of a modulating signal in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 6, as well as other operations described herein, can be implemented as instructions stored in a computer readable medium and executed by a processor.

In block 602, the FM system 110 determines whether a modulation signal, s(t), is present. Embodiments may use various methods to determine whether a modulation signal is present. For example, some embodiments may determine signal presence based on a signal amplitude threshold. Other embodiments may receive status from a signal source indicating whether a modulation signal is being provided. If a modulation signal is detected, then the operation of the method continues in block 608 as described below.

If no modulation signal is deemed present in block 602, then, in block 604, the FM system 110 determines whether an FM receiver 114 that receives FM signals from the transmitter 314 should be provided with an FM signal to maintain acceptable performance. The FM system 110 may base such a determination on, for example, a predetermined maximum time interval for FM transmitter 314 inactivity. If, in block 604, FM receiver 114 performance is deemed acceptable, then, in block 606, the FM transmitter 314 may be disabled. In some embodiments, rather than disabling the transmitter, transmit power may be reduced or intermittent transmissions may commence. If, in block 604, the FM system 110 determines that an FM transmission is required to maintain acceptable receiver performance, then the method continues in block 608.

In block 608, the priority of the FM system 110 relative to the wireless networking system 112 is determined. In at least some embodiments, the priority controller 302 makes the priority determination. If the wireless networking system 112 has priority over the FM system 110, then, in block 606, the FM transmitter 314 may be disabled, or have its operation modified in another manner to reduce interference with the wireless networking system 112.

If, in block 608, the FM system 110 has priority over the wireless networking system 112, then, in block 610, the FM system 110 can enable the FM transmitter 314. Some embodiments may enable the FM transmitter 314 for at least a predetermined interval when desirable to maintain FM receiver 114 performance even if the wireless networking system 112 has priority over the FM system. Moreover, some embodiments may enable the FM transmitter 314, either continuously or intermittently, when no modulating signal is present and the wireless networking system 112 has lower priority than the FM system 110.

Table 1 below illustrates exemplary operation of the FM system 110 and the wireless networking system 112 (i.e., a colocated wireless technology ("CWT")) based on presence of modulation signal s(t), wireless networking system 112 activity, and FM receiver 114 operation.

TABLE 1

| Scenario | s(t) Present | CWT Active | FM Rcvr Priority | FM Tx State |
| --- | --- | --- | --- | --- |
| 1 | 0 | 0 | 0 | ON |
| 2 | 0 | 0 | 1 | ON |
| 3 | 0 | 1 | 0 | OFF |
| 4 | 0 | 1 | 1 | Flow Dependent |
| 5 | 1 | 0 | 0 | ON |
| 6 | 1 | 0 | 1 | ON |
| 7 | 1 | 1 | 0 | Flow Dependent |
| 8 | 1 | 1 | 1 | Flow Dependent |

Scenario 1 shows that no modulating signal s(t) is present, the wireless network is inactive (i.e., no transmissions detected in receiver 304 and transmitter 306 has no data to transmit), and the FM receiver 114 is not in need of signal to maintain performance. Given these conditions, the FM transmitter 314 can be enabled either continuously or intermittently.

In scenario 2, no modulating signal s(t) is present, and the wireless network is inactive, but the FM receiver 114 is in need of signal to maintain performance. Given these conditions, the FM transmitter 314 can be enabled either continuously or intermittently.

In scenario 3, no modulating signal s(t) is present, and the FM receiver 114 is not in need of signal to maintain performance. The wireless network is active, and consequently, the FM transmitter 314 can be disabled, or in some embodiments operate at a reduced output power level.

In scenario 4, no modulating signal s(t) is present, but the wireless network is active, and the FM receiver 114 is in need of signal to maintain performance. Given these conditions, whether the FM transmitter 314 is enabled may be based on other system considerations, for example, the attributes of the network transmission. If, for example, the flow being received at or transmitted by the wireless networking system 112 is best effort, then the FM transmitter 314 may be enabled to inhibit performance degradation in the FM receiver 114.

In scenario 5, a modulating signal s(t) is present, the wireless network is inactive, and the FM receiver 114 is not in need of signal to maintain performance. Given these conditions, the FM transmitter 314 can be enabled.

In scenario 6, a modulating signal s(t) is present, the wireless network is inactive, and the FM receiver 114 is in need of signal to maintain performance. Given these conditions, the FM transmitter 314 can be enabled.

In scenario 7, a modulating signal s(t) is present, the wireless network is active, and the FM receiver 114 is not in need of signal to maintain performance. Given these conditions, whether the FM transmitter is enabled may be based on consideration involving both the network and FM flows. If, for example, the flow being received at or transmitted by the wireless networking system 112 is best effort, and the FM transmitter 314 is transmitting an audio file, then the FM transmitter 314 may be enabled to provide acceptable audio performance.

In scenario 8, a modulating signal s(t) is present, the wireless network is active, and the FM receiver 114 is in need of signal to maintain performance. This scenario involves considerations similar to those of scenarios 4 and 7 above. Consequently, whether the FM transmitter 314 is enabled may be based, at least in part, on the nature of the FM and network data flows.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A mobile wireless device, comprising:
   a frequency modulation ("FM") system comprising an FM transmitter and, optionally, an FM receiver;
   a wireless networking system comprising a network receiver that receives signals transmitted via a wireless network;
   wherein, the FM system is configured to disable the FM transmitter if an amplitude of a modulating signal provided to the FM transmitter is below a predetermined threshold.

2. The mobile wireless device of claim 1, wherein the FM system disables FM carrier transmission for a predetermined maximum time interval if the modulating signal is below the predetermined threshold.

3. The mobile wireless device of claim 2, wherein the network receiver causes assertion of a priority indication to the FM system, and the priority indication causes the FM system to reduce interference with the network receiver.

4. The mobile wireless device of claim 3, wherein the FM system disables the FM transmitter if the priority indication is asserted.

5. The mobile wireless device of claim 3, wherein the FM transmitter reduces transmit power if the priority indication is asserted.

6. The mobile wireless device of claim 3, wherein the FM transmitter enables carrier transmission if the priority indication is negated.

7. The mobile wireless device of claim 3, wherein the network receiver causes assertion of the priority indication if the network receiver detects a signal transmitted via the wireless network.

8. The mobile wireless device of claim 1, further comprising a priority controller that determines to which of the FM receiver and the network receiver a device hardware resource is allocated.

9. The mobile wireless device of claim 1, wherein the wireless networking system further comprises a network transmitter that causes assertion of a priority indication to the FM system, and the priority indication causes the FM transmitter to reduce interference with the networking system.

10. The mobile wireless device of claim 9, wherein the network transmitter causes assertion of the priority indication if the network transmitter is transmitting.

11. A method, comprising:
    determining whether a wireless networking system in a mobile wireless device is active;
    asserting a first priority signal provided to a frequency modulation ("FM") system in the mobile wireless device by the wireless networking system if the wireless networking system is active;
    changing operation of an FM transmitter to reduce a level of interference induced in the wireless networking system by the FM system based on the assertion of the priority signal.

12. The method of claim 11, further comprising disabling the FM transmitter in the FM system if the priority signal is asserted.

13. The method of claim 11, further comprising reducing the output power of the FM transmitter in the FM system if the priority signal is asserted.

14. The method of claim 11, further comprising determining that the wireless networking system is active if one of a transmitter and a receiver in the wireless networking system is active, and negating the priority signal if the wireless networking system is inactive.

15. The method of claim 11, further comprising disabling carrier transmission by the FM system if an amplitude of a carrier modulation signal provided to the FM system is below a predetermined threshold.

16. The method of claim 15, further comprising disabling carrier transmission for a maximum predetermined time period if the amplitude of the carrier modulation signal provided to the FM system is below the predetermined threshold, the time period is based on a performance of an FM receiver not colocated in the mobile wireless device.

17. A mobile wireless device, comprising:
    a frequency modulation ("FM") system;
    a wireless networking system colocated in the mobile wireless device with the FM system; and
    a priority controller that assigns operational priorities to the FM system and the wireless networking system based, at least in part, on types of data being processed by the FM system and the wireless networking system;
    wherein the one of the FM system and the wireless networking system assigned a lower priority operates to reduce a level of interference induced in the one of the FM system and the wireless networking system assigned a higher priority.

18. The mobile wireless device of claim 17, wherein the priority controller sets the operational priorities based, at least in part, on a performance requirement of an FM receiver not colocated in the mobile wireless device.

19. The mobile wireless device of claim 17, wherein the priority controller sets the operational priorities based, at least in part, on which of an FM receiver, an FM transmitter, a wireless network receiver, and wireless network transmitter is active.

20. A mobile wireless device, comprising:
    a frequency modulation ("FM") system;
    a wireless networking system through which the mobile wireless device accesses a wireless network, the wireless networking system comprises a network receiver and a network transmitter;
    a hardware resource that is shared by the FM system and the wireless networking system; and
    a priority controller that allocates the hardware resource to one of the FM system and the wireless networking system.

21. The mobile wireless device of claim 20, wherein the FM system comprises an FM receiver, and the priority controller allocates the shared hardware resource to one of the FM receiver and the network receiver based, at least in part, on whether the network receiver is detecting a signal transmitted via the wireless network.

22. The mobile wireless device of claim 20, wherein the FM system comprises an FM transmitter, and the priority controller allocates the shared hardware resource to one of the FM transmitter and the network transmitter based, at least in part, on whether the network transmitter needs to transmit over the wireless network.

* * * * *